(12) United States Patent
Breault et al.

(10) Patent No.: US 6,361,891 B1
(45) Date of Patent: Mar. 26, 2002

(54) DIRECT ANTIFREEZE COOLED FUEL CELL POWER PLANT SYSTEM

(75) Inventors: Richard D. Breault, North Kingstown, RI (US); David A. Condit, Avon, CT (US); Leslie L. Van Dine, Manchester, CT (US); Margaret M. Steinbugler, East Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/467,810

(22) Filed: Dec. 20, 1999

(51) Int. Cl.[7] .......................... H01M 8/04; H01M 8/10; H01M 8/06
(52) U.S. Cl. ............................. 429/26; 429/24; 429/22
(58) Field of Search ................................ 429/22, 26, 24

(56) References Cited

U.S. PATENT DOCUMENTS

| | | | |
|---|---|---|---|
| 3,779,811 A | * | 12/1973 | Bushnell et al. |
| 5,176,966 A | | 1/1993 | Epp et al. |
| 5,700,595 A | | 12/1997 | Reiser |
| 5,776,624 A | * | 7/1998 | Neutzler ........................ 429/26 |
| 6,013,385 A | * | 1/2000 | Dubose ........................ 429/17 |

FOREIGN PATENT DOCUMENTS

DE          19802490      *  7/1999

* cited by examiner

Primary Examiner—Carol Chaney
Assistant Examiner—Tracy Dove
(74) Attorney, Agent, or Firm—Malcolm J. Chisholm, Jr.

(57) ABSTRACT

A direct antifreeze cooled fuel cell power plant system is disclosed for producing electrical energy from reducing and process oxidant fluid reactant streams. The system includes at least one fuel cell for producing electrical energy from the reducing and oxidant fluid streams; a thermal management system that directs flow of a cooling fluid for controlling temperature within the plant including a porous water transport plate adjacent and in direct fluid communication with a cathode catalyst of the fuel cell; a direct antifreeze solution passing through the water transport plate; and, fuel processing components secured in fluid communication with the thermal management system for processing a hydrocarbon fuel into the reducing fluid and for controlling a concentration of a direct antifreeze in the direct antifreeze solution. The fuel processing components may include a boiler that receives a portion of the direct antifreeze solution from the thermal management system; a steam separator that directs separated steam from the boiler to a reformer for reforming the hydrocarbon fuel to the reducing fluid, and that directs separated liquid direct antifreeze solution back to the thermal management system. A preferred direct antifreeze solution is an alkanetriol selected from the group consisting of glycerol, butanetriol, and pentanetriol.

37 Claims, 4 Drawing Sheets

FIG. 1

DIRECT ANTIFREEZE COOLED FUEL CELL POWER PLANT SYSTEM

TECHNICAL FIELD

The present invention relates to fuel cells assembled together to form a fuel cell power plant suited for usage in transportation vehicles, portable power plants, or as stationary power plants, and the invention especially relates to a direct antifreeze cooled fuel cell power plant system that utilizes a direct antifreeze solution passing through the plant to remove heat.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is the aforesaid proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention.

Manufacture of fuel cells utilizing PEM electrolytes typically involves securing an appropriate first catalyst layer, such as a platinum alloy, between a first surface of the PEM and a first or anode porous substrate layer to form an anode electrode adjacent the first surface of the PEM, and securing a second catalyst layer between a second surface of the PEM opposed to the first surface and a second or cathode porous substrate layer to form a cathode electrode on the opposed second surface of the PEM. The anode catalyst, PEM, and cathode catalyst secured in such a manner are well-known in the art, and are frequently referred to as a "membrane electrode assembly", or "M.E.A.", and will be referred to herein as a membrane electrode assembly. In operation of PEM fuel cells, the membrane is saturated with water, and the anode electrode adjacent the membrane must remain wet. As hydrogen ions produced at the anode electrode transfer through the electrolyte, they drag water molecules in the form of hydronium ions with them from the anode to the cathode electrode or catalyst. Water also transfers back to the anode from the cathode by osmosis. Product water formed at the cathode electrode is removed from the cell by evaporation or entrainment into a gaseous stream of either the process oxidant or reducing fluid. In fuel cells containing porous reactant flow fields, as described in U.S. Pat. No. 4,769,297, owned by the assignee of all rights in the present invention, a portion of the water may be alternatively removed as a liquid through the porous reactant flow field to a circulating cooling fluid.

While having important advantages, PEM cells are also known to have significant limitations especially related to liquid water transport to, through and away from the PEM, and related to simultaneous transport of gaseous reducing fluids and process oxidant fluids to and from the electrodes adjacent opposed surfaces of the PEM. The prior art includes many efforts to minimize the effect of those limitations. Use of such fuel cells assembled together in a well known fuel cell stack with additional components to form a fuel cell power plant in order to power a transportation vehicle gives rise to additional problems associated with water management, such as preventing the product water from freezing, and rapidly melting any frozen water during start up whenever the fuel-cell powered vehicle is operated in sub-freezing conditions. Known fuel cell power plants typically utilize a coolant or thermal management system supplying a flow of cooling fluid through the fuel cell and other plant components to maintain the cell within an optimal temperature range and efficiently distribute heat. Where the cooling fluid is a solution including water it also must be kept from freezing. It is known to utilize an antifreeze solution such as ethylene glycol and water or propylene glycol and water as a cooling fluid in such coolant systems.

However, such antifreeze solutions are known to be adsorbed by and poison the catalysts that form electrodes. Furthermore, those antifreeze solutions have low surface tensions which results in the solutions wetting any wet-proofed support layers adjacent cell catalysts, thereby impeding diffusion of reactant fluids to the catalysts, which further decreases performance of the electrodes. Also, the vapor pressure of those antifreezes is too high, resulting in excessive loss rates of the antifreeze solutions through fuel cell exhaust streams or from steam produced in boilers of fuel processing components of fuel cell power plants. Therefore coolant systems of fuel cells that utilize an antifreeze solution are known to be sealed from the electrodes, so that the solution is not in direct fluid communication with the electrode catalysts.

Sealing the coolant system from direct fluid communication with the cell and hence with the product water formed at the cathode electrode results in decreased cell performance due to less efficient removal of the product water. Fuel cell power plants that utilize sealed coolant plates typically remove product water as an entrained liquid. This requires a tortuous serpentine flow path with a resultant high pressure drop. An example of such a cell is shown in U.S. Pat. No. 5,773,160. That type of cell is not suitable for operating at near ambient reactant pressures which is a preferred operating pressure for many fuel cell systems. The decreased performance of cells with sealed coolant plates requires that additional cells be used to satisfy the design power requirement. The additional cells combined with heavier, sealed coolers results in an increase in weight and volume of a fuel cell power plant which is undesirable for powering a vehicle.

Additionally, where a fuel cell power plant powers a vehicle, the atmosphere serving as a process oxidant stream directed into contact with the cathode electrode will vary significantly in humidity. Consequently, it is known to undertake substantial efforts to humidify the process oxidant and reducing fluid reactant streams in order to minimize water loss from the PEM electrolyte. Known efforts include recycling some of the product water from the cell, and/or directing some of the cooling fluid within the coolant system as a vapor into the process oxidant and/or reducing fluid streams entering the fuel cell. However, with known fuel cells, the humidity enhancing fluid must be free of any antifreeze solutions in order to prevent the antifreeze from poisoning the catalysts. Known fuel cells therefore utilize sealed coolant systems that are isolated from humidification systems. For example, one known fuel cell humidification systems utilizes complex, heavy and large membrane barrier components consisting of uncatalyzed PEM cells upstream of catalyzed cells in order to isolate any antifreeze solution within the cooling fluid or within the product water mixed with cooling fluid from contact with the electrode catalysts. Such efforts to isolate the antifreeze solution add to the cost, weight and volume of the fuel cell.

As fuel cells have been integrated into power plants developed to power transportation vehicles such as automobiles, trucks, buses, etc., maintaining a water balance within the power plant has become a greater challenge because of a variety of factors. For example, with a stationary fuel cell power plant, water lost from the plant may be replaced by water supplied to the plant from off-plant sources. With a transportation vehicle, however, to minimize fuel cell power plant weight and space requirements, the plant must be self-sufficient in water to be viable. Self-sufficiency in water means that enough water must be retained within the plant to offset water losses from gaseous streams of reactant fluids passing through the plant. For example, any water exiting the plant through a cathode exhaust stream of gaseous oxidant or through an anode exhaust stream of gaseous reducing fluid must be balanced by water produced electrochemically at the cathode and retained within the plant.

An additional difficulty in maintaining water self-sufficiency in fuel cell power plants is associated with components necessary to process hydrocarbon fuels, such as methane, natural gas, methanol, gasoline, diesel fuel, etc., into an appropriate reducing fluid that provides a hydrogen rich fluid to the anode electrode. Such fuel processing components of a fuel cell power plant typically include a boiler that generates steam; a steam duct into which the hydrocarbon fuel is injected; and an autothermal reformer that receives the steam and fuel mixture along with a small amount of a process oxidant such as air and transforms the mixture into a hydrogen rich reducing fluid appropriate for delivery to the anode electrode of the fuel cell. The fuel processing components also include system water and energy requirements that are part of an overall water balance and energy requirement of the fuel cell power plant. Water made into steam in the boiler must be replaced by water recovered from the plant such as by condensing heat exchangers in the cathode exhaust stream and associated piping.

A further problem associated with using fuel cell power plants in transportation vehicles arises from a need to have such vehicles capable of commencing immediate operation without any significant warm-up period. Use of a boiler to generate steam in the fuel processing system, however, requires either a warm up period; a substantial energy cost to rapidly initiate boiling; or, an alternative fuel source for the cells or power source for the plant until the fuel processing components are capable of generating adequate fuel.

Another difficulty associated with cooling fuel cells wherein the cooling fluid contacts cell components is limiting conductivity of the cooling fluid to avoid shunt current corrosion that results from a conductive cooling fluid providing a conductive bridge between cell components. Where the cooling fluid includes water, or similar solvents dissolved metals and other ions must be removed, such as by passing the cooling fluid through a demineralizer as shown in U.S. Pat. No. 4,344,850 to Grasso, which Patent is owned by the assignee of all rights in the present invention, and which Patent is hereby incorporated herein by reference. However, when such a demineralizer or similar water treatment system is utilized within a fuel cell power plant in a vehicle, the cooling fluid within the water treatment system components must also be protected against freezing. If the cooling fluid were to freeze, it could cause mechanical damage to components of a water treatment system such as a demineralizer; it would require melting during a start-up procedure; and, where a demineralizer includes ion exchange resin beads, the freezing and thawing cooling fluid could cause break up of the beads, resulting in a high pressure drop and impeded flow within the demineralizer. Consequently, the water treatment system for treating the cooling fluid must be freeze protected without adding significant further weight and cost to the fuel cell power plant.

Accordingly there is a need for a fuel cell power plant that has fuel processing components that may be operated in sub-freezing conditions; that does not require isolating an antifreeze cooling fluid from the cathode and anode catalysts within a sealed coolant system; that minimizes pure water within the system that may be frozen whenever the fuel cell is shut down and not operating while subjected to sub-freezing temperatures; that maintains a self-sufficient water balance during operation; that can achieve a rapid generation of power without a requirement of first melting substantial amounts of frozen pure water; and, that does not require significant increases in weight, volume or cost of the fuel cell power plant.

DISCLOSURE OF THE INVENTION

A direct antifreeze cooled fuel cell power plant system is disclosed for producing electrical energy. The system includes at least one fuel cell for producing electrical energy from a reducing fluid and process oxidant reactant stream; a thermal management system that directs flow of a cooling fluid for controlling temperature within the plant including a porous water transport plate adjacent and in fluid communication with a cathode catalyst of the fuel cell; a direct antifreeze solution circulating through the water transport plate; and, fuel processing components secured in fluid communication with the thermal management system for processing a hydrocarbon fuel into the reducing fluid and for controlling a concentration of direct antifreeze in the direct antifreeze solution. The fuel processing components include a burner that generates heat; a boiler in heat transfer relationship with the burner that receives the direct antifreeze solution through a boiler feed line from the thermal management system and boils the direct antifreeze solution; a steam separator that receives steam and liquid direct antifreeze solution from the boiler and separates the steam from the liquid; a reformer that receives the separated steam in a steam feed line from the steam separator and reforms the hydrocarbon fuel into the reducing fluid; and, a liquid return line that returns the separated liquid direct antifreeze solution to the thermal management system. In a preferred embodiment, the system also includes steam injection lines for directing some of the steam into an oxidant inlet and reducing fluid inlet for enhancing humidity of the oxidant and reducing fluid reactant streams.

In another alternative embodiment of the direct antifreeze cooled fuel cell power plant system, an anode exhaust passage is included that receives an anode exhaust stream exiting the fuel cell and directs the anode exhaust stream into the burner, then directs the combusted burner exhaust stream from the burner into a plant exhaust passage to mix with an exhaust portion of the process oxidant stream exiting the fuel cell to become a plant exhaust stream. In an additional alternative embodiment, the system includes a direct mass and heat transfer device secured in fluid communication with both the oxidant inlet that directs the process oxidant stream into the fuel cell and also with the plant exhaust passage so that the device directly transfers through a mass transfer medium mass and heat such as water exiting the plant in the plant exhaust stream within the plant exhaust passage back into the plant within the process oxidant stream. The mass transfer medium may be the direct antifreeze solution cooling fluid directed from the thermal management system to pass through the direct mass and heat transfer device.

In yet a further alternative embodiment, the system may include a fuel processing thermal exchange loop for removing heat from the fuel processing components that may also be secured in heat exchange relationship with the thermal management system. In an additional alternative embodiment the direct antifreeze cooled fuel cell power plant system includes a water treatment system having a demineralizer in fluid communication with the cooling fluid, and having a degasifier also in fluid communication with the cooling fluid that passes the cooling fluid in mass transfer relationship with the process oxidant stream so that dissolved gases in the cooling fluid transfer from the cooling fluid into the process oxidant stream.

In a further embodiment of the system, the direct antifreeze solution circulating through the water transport plate may be directed to flow at a pressure that is less than a pressure of the process reactant streams passing adjacent the water transport plate. A preferred fuel cell operates at near ambient pressure and the process oxidant stream and reducing fluid stream are pressurized to 1 to 2 pounds per square inch gauge (hereafter "PSIG") above ambient pressure, while the direct antifreeze solution is directed to flow through the water transport plate at about 1 to 2 PSIG below ambient pressure. Such a positive pressure differential between the process oxidant stream and the antifreeze solution within the water transport plate further assists movement of product water formed at a cathode catalyst of the fuel cell into the water transport plate. The positive pressure differential also limits movement of any liquid antifreeze solution flowing within the water transport plate from flowing out of the water transport plate into the higher pressure process reactant streams passing within reactant flow fields defined adjacent to and/or within fluid communication with the water transport plate.

The direct antifreeze solution of the invention may be any organic antifreeze solution that is non-volatile at cell operating temperatures and that does not wet a hydrophobic substance such as "TEFLON". For purposes herein, "non-volatile" is defined to mean that the antifreeze solution sustains a loss of less than 10% of its antifreeze for every 500 operating hours of the fuel cell power plant at fuel cell operating temperatures. Alternatively, a first preferred direct antifreeze solution may be a special direct antifreeze solution having the following characteristics: 1. a freezing point of at least −20 degrees Fahrenheit (hereafter "° F."); 2. a surface tension greater than 60 dynes per centimeter (hereafter "dyne/cm") at a cell operating temperature of about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred antifreeze solution may be an alkanetriol direct antifreeze solution, and in particular an alkanetriol selected from the group consisting of glycerol, butanetriol, and pentanetriol. The direct, special and alkanetriol direct antifreeze solutions minimize movement of the antifreeze as a vapor out of the water transport plate into contact with the cathode or anode catalysts, and also minimize direct antifreeze solution loss from the thermal management system, fuel processing components, direct mass and heat transfer system, and water treatment system of the power plant as well as from any other fuel cell components such as the plant exhaust stream exiting the cell.

Accordingly it is a general object of the present invention to provide a direct antifreeze cooled fuel cell power plant system that overcomes deficiencies of the prior art.

It is a more specific object to provide a direct antifreeze cooled fuel cell power plant system that eliminates need for a separate sealed thermal management system for operation in sub-freezing conditions.

It is another object to provide a direct antifreeze cooled fuel cell power plant system that processes a hydrogen rich reducing fluid with a minimum amount of liquid water.

It is yet another object to provide a direct antifreeze cooled fuel cell power plant system that eliminates any need for uncatalyzed membrane barrier components of a humidification system between an antifreeze cooling fluid and the fuel cell.

It is another object to provide a direct antifreeze cooled fuel cell power plant system that minimizes liquid water that may freeze when the power plant is not operating but is situated in a sub-freezing environment.

It is yet a further object to provide a direct antifreeze cooled fuel cell power plant system that directly transfers mass and heat leaving the power plant back into the plant through a mass transfer liquid medium supplied from a thermal management system.

These and other objects and advantages of the present direct antifreeze cooled fuel cell power plant system will become more readily apparent when the following description is read in conjunction with the accompanying drawings.

BRIEF DESCRIPTION OF THE DRAWINGS

FIG. 1 is a schematic representation of a first embodiment of a direct antifreeze cooled fuel cell power plant system constructed in accordance with the present invention.

DESCRIPTION OF THE PREFERRED EMBODIMENTS

Figure 1:
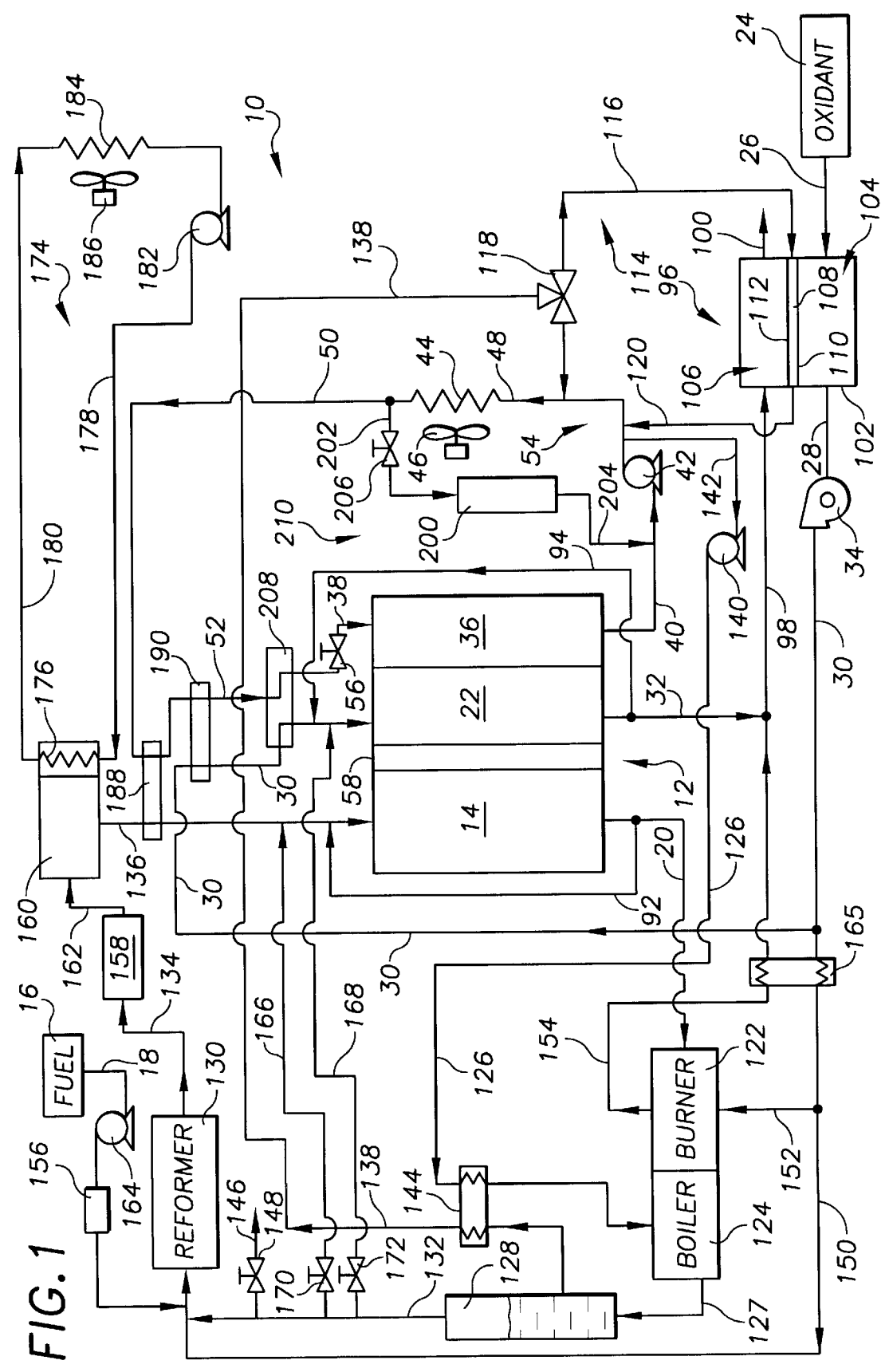
Figure 2:
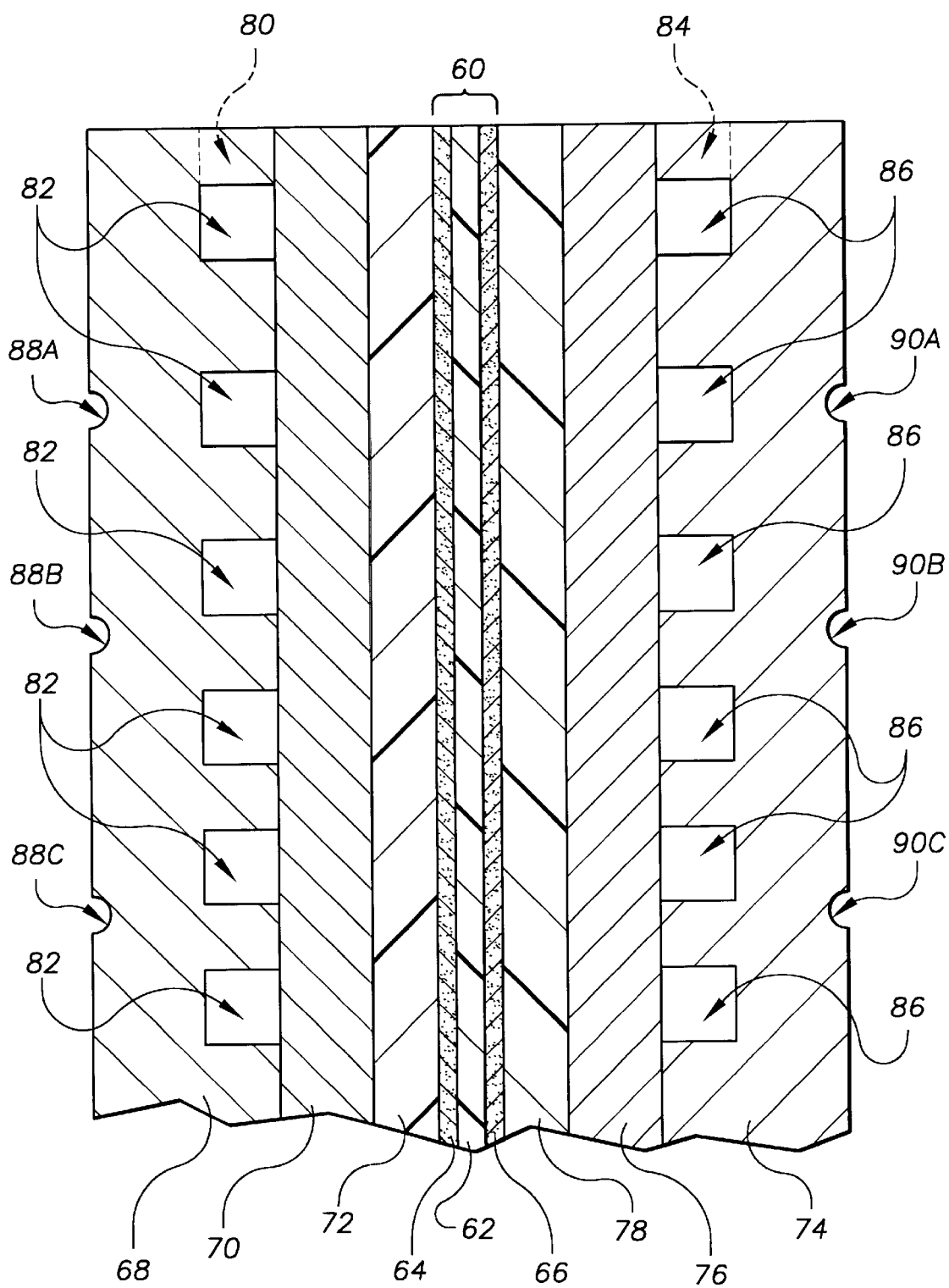
FIG. 2 is a schematic, cross-section, fragmentary view of fuel cell components of a fuel cell of a direct antifreeze cooled fuel cell power plant system of the present invention.

Referring to the drawings in detail, a first embodiment of a direct antifreeze cooled fuel cell power plant system of the present invention is shown in FIG. 1, and is generally designated by the reference numeral 10. The system 10 includes at least one fuel cell means for producing electrical energy from reducing fluid and process oxidant reactant streams such as fuel cell 12. The fuel cell 12 includes an anode flow field 14 that receives a reducing fluid directed from a fuel supply component 16 through a fuel delivery line 18 to flow through the anode flow field 14 and leave the cell 12 through an anode exhaust passage 20. The cell also includes a cathode flow field 22 that receives a process oxidant stream directed from an oxidant supply component 24 through an oxidant inlet 26 in fluid communication with a first oxidant inlet extension 28, and a second oxidant inlet extension 30 into the cathode flow field 22. The process oxidant stream passes out of the cathode flow field 22 and fuel cell 12 within a cathode exhaust passage 32.

An oxidant blower 34 may be positioned on the oxidant inlet 26, such as between the first and second extensions 28, 30 of the oxidant inlet 26 to variably flow the gaseous oxidant stream into the fuel cell 12. It is stressed, however, that preferably such a blower 34 only increases operating pressures of the process oxidant stream to a range of from atmospheric pressure to about 1.0–2.0 pounds per square inch above atmospheric pressure, or from about 14.7 to about 16.7 pounds per square inch atmospheric (hereafter "PSIA"). Although the direct antifreeze cooled fuel cell power plant system 10 preferably operates at about ambient pressure, it is anticipated that the system 10 may also be effectively operated at pressures of several atmospheres.

A porous water transport plate 36 is secured adjacent the cathode flow field 22 and receives a cooling fluid such as a direct antifreeze solution through a coolant feed line 38 and passes the solution out of the plate 36 through a coolant discharge line 40. The water transport plate 36 serves to cool the fuel cell means 12, and may be referred to occasionally as a "cooler plate". The coolant feed line 38 and coolant discharge line 40 may be in fluid communication with a coolant pump 42 and a coolant heat exchanger 44 having a coolant fan 46, so that the coolant pump 42 pumps the cooling fluid through a coolant feed line first extension 48, through the coolant heat exchanger 44, a coolant feed line second extension 50 and third extension 52, the coolant feed line 38, water transport plate 36 and coolant discharge line 40 back to the coolant pump 42. The coolant pump 42, heat exchanger 44 and coolant feed lines 38, 48, 50, 52, water transport plate 36 and coolant discharge line 40 form part of a thermal management system means 54 for controlling temperature within the direct antifreeze cooled fuel cell power plant system 10. While the thermal management system means 54 shows the direct antifreeze solution cooling fluid cycling through the water transport plate 36, alternatively, the thermal management system 54 may direct the cooling fluid through the water transport plate 36 without repeatedly cycling all of the cooling fluid through the coolant feed lines 38, 48, 50, 52, coolant heat exchanger 44, and water transport plate 36. In such an embodiment of the thermal management system 54, the cooling fluid may be part of a more elaborate system, such as an alternative embodiment discussed below.

The direct antifreeze cooled fuel cell power plant system 10 may also include a pressure control means for maintaining a positive pressure differential between the reactant streams passing through the anode and cathode flow fields 14, 22 and the cooling fluid passing through the water transport plate 36. The pressure control means may include the coolant pump 42 coordinated with a pressure control valve means for maintaining a specific pressure of the cooling fluid within the third extension 52 of the coolant feed line down stream of the valve means, water transport plate 36 and coolant discharge line 40, such as a pressure control valve 56 secured between the coolant pump 42 and the water transport plate 36, such as on the coolant feed line 38. As is well-known, the pressure control valve 56 may be set manually, automatically, or, for example, may be electro-mechanically adjusted based upon a reference pressure within the process oxidant stream within the cathode flow field 22 to restrict flow through the valve 56 so that the stream of cooling fluid drawn into the coolant pump 42 from the coolant feed line 38, water transport plate 36, coolant discharge line 40 and coolant heat exchanger 44 is at a pressure lower than the pressure of the process oxidant stream within the cathode flow field 22. Additional pressure control means for purposes herein may include any well-known mechanism that can reduce pressure of a liquid stream below a reference pressure of a gaseous stream, such as disclosed in U.S. Pat. No. 5,700,595, issued on Dec. 23, 1997 to Reiser and assigned to the assignee of the present invention, which patent is hereby incorporated herein by reference. The materials making up the thermal management system 54 may be manufactured of standard materials well-known in the art such as heat exchangers common to automobile technology, and piping and valving well-known in the chemical processing arts, etc.

The fuel cell means 12 also includes a membrane electrode assembly 58 (hereafter occasionally referred to as "M.E.A." for convenience) secured between the anode flow field 14 and cathode flow field 22 that facilitates an electrochemical reaction involving the reducing fluid and oxidant stream to generate electrical energy that is conducted through a standard circuit (not shown) to an energy consuming load, such as an electric motor (not shown) to power, for example, a transportation vehicle (not shown). It is also well-known to secure the fuel cell 12 adjacent a plurality of similar fuel cells (not shown) to form a cell stack assembly enclosed within a frame structure that defines manifolds for directing the reducing fluid, process oxidant, and cooling fluid streams into and out of the fuel cell 12 in a manner well-known in the art.

An exemplary M.E.A. 60 is shown in greater detail in FIG. 2, and for purposes herein is defined to include an electrolyte 62 such as a proton exchange membrane ("PEM"), an anode catalyst 64, and a cathode catalyst 66 secured on opposed sides of the electrolyte 62. The fuel cell means 12 may also include an anode support means that is secured in direct fluid communication with the anode catalyst 64 between an anode water transport plate 68 and the anode catalyst 64 for passing the reducing fluid stream adjacent the anode catalyst 64. The anode support means may include one or more porous layers, such as a porous anode substrate 70, a porous anode diffusion layer 72, or both the porous anode substrate 70 and porous anode diffusion layer 72 secured adjacent each other between the anode water transport plate 68 and anode catalyst 64 (as shown in FIG. 2). One or both of the porous layers 70, 72 may be wetproofed depending upon cell 12 performance requirements. In a preferred embodiment, at least one of the porous layers 70, 72 of the anode support means is wetproofed to make the pores hydrophobic.

The fuel cell 12 may also include a cathode support means that is secured in direct fluid communication with the cathode catalyst 66 between a cathode water transport plate 74 and the cathode catalyst 66 for passing the process oxidant stream adjacent the cathode catalyst 66. The cathode support means may include one or more porous layers, such as a porous cathode substrate 76, a porous cathode diffusion layer 78, or both the porous cathode substrate 76 and porous cathode diffusion layer 78 secured adjacent each other between the cathode water transport plate 74 and cathode catalyst 66. One or both of the porous layers 76, 78 of the cathode support means may be wetproofed depending upon performance requirements of the cell 12. In a preferred embodiment, at least one of the porous cathode support layers 76, 78 of the cathode support means is wetproofed to make the pores hydrophobic.

The porous cathode substrate 76 and porous anode substrate 70 may be porous carbon-carbon fibrous composites having a porosity of about 65% to about 75%, and may be wetproofed by a hydrophobic substance such as "Teflon" to a concentration of approximately 0.18 grams per cubic centimeter. The porous cathode gas diffusion layer 78 and porous anode diffusion layer 72 may be about a 50% carbon material and about 50% hydrophobic material such as Teflon. The porous cathode water transport plate 74 is in direct fluid communication with the porous cathode substrate 76, porous cathode diffusion layer 78 and the cathode catalyst 66. Similarly, the porous anode water transport plate 68 is in direct fluid communication with the porous anode substrate 70, porous anode diffusion layer 72 and the anode catalyst 64.

It is pointed out that an anode flow field (shown schematically in the FIG. 1 embodiment at reference numeral 14), may consist, in the FIG. 2 schematic representation, of a fuel inlet 80, and a plurality of reducing fluid or fuel flow channels 82 defined within the anode water transport plate 68. Similarly, a cathode flow field may consist of an oxidant inlet 84, and a plurality of oxidant flow channels 86 defined within the cathode water transport plate 74. The anode flow field 14 and cathode flow field 22 may also consist of cavities, differing channels or grooves well-known in the art and defined within fuel cell components and a fuel exit and oxidant exit to direct the fuel and process oxidant streams to pass into, through and out of the cell 12 in contact with the anode and cathode catalysts 64, 66. As shown in FIG. 2, the porous anode and cathode water transport plates 68, 74 may be structured to cooperate with adjacent water transport plates (not shown) so that anode side coolant channels 88A, 88B and 88C defined within the anode water transport plate 68, and cathode side coolant channels 90A, 90B, and 90C defined within the cathode water transport plate 74 may cooperate in mirror-image association with coolant channels of the adjacent water transport plates of adjacent fuel cells (not shown) in a cell stack assembly to form a network of coolant channels for delivering a cooling fluid stream to the water transport plates 68, 74.

In operation of the fuel cell means 12, the anode side coolant channels 88A, 88B, 88C and cathode side coolant channels 90A, 90B, 90C are in fluid communication with the coolant feed line 38 and coolant discharge line 40, so that a cooling fluid stream from the coolant feed line 38 passes through the anode and cathode coolant channels, and into the anode and cathode water transport plates 68, 74 to saturate the pore volume of the water transport plates. The cooling fluid stream then passes into the coolant discharge line 40. By filling the open pore volume of the anode and cathode water transport plates 68, 74, the cooling fluid stream of the direct antifreeze solution forms a gas barrier or seal preventing the gaseous reducing fluid in the reducing fluid fuel channels 82 from flowing into oxidant channels in an adjacent cell. Optionally wetproofing the porous anode substrate 70 layer and/or porous anode diffusion layer 72 further restricts movement of any liquid antifreeze solution out of the anode water transport plate 68 through the anode substrate and diffusion layers 70, 72 into contact with the anode catalyst 64.

Similarly, optionally and preferably wetproofing the porous cathode substrate layer 76 and/or cathode diffusion layer 78, further restricts movement of any liquid direct antifreeze solution out of the cathode water transport plate 74 through the cathode substrate 76 and cathode diffusion layer 78 and into contact with the cathode catalyst 66. Additionally, as the fuel cell 12 operates, product water formed at the cathode catalyst 66 is removed as water vapor into the process oxidant stream flowing through the cathode flow field or oxidant channels 86 defined within the cathode water transport plate 74, or as liquid into the cathode water transport plate 74. Therefore, much of the product water moves out of the cathode flow field 86 and into the direct antifreeze solution coolant stream passing through the porous cathode water transport plate 74, especially when the pressure control valve means 56 is causing a positive pressure differential between the reducing fluid and process oxidant reactant streams within the anode and cathode flow fields 14, 22 or reducing fluid channels 82 or oxidant channels 86 and the antifreeze coolant stream within the cathode water transport plate 74 adjacent the fuel and oxidant flow channels 82, 86.

The direct antifreeze solution may be any organic antifreeze solution that does not wet the wetproofed cathode substrate and that is essentially non-volatile at cell operating temperatures. For purposes herein, "non-volatile" is defined to mean that the antifreeze solution sustains a loss of less than 10% of its antifreeze for every 500 operating hours of the fuel cell at fuel cell operating temperatures. Alternatively, a first preferred direct antifreeze solution may be a special direct antifreeze solution having the following characteristics: 1. a freezing point of at least −20 degrees Fahrenheit (hereafter "° F"); 2. a surface tension greater than 60 dynes per centimeter (hereafter "dyne/cm") at about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred antifreeze solution may be an alkanetriol direct antifreeze solution, and in particular an alkanetriol selected from the group consisting of glycerol, butanetriol, and pentanetriol. The alkanetriol direct antifreeze may be an antifreeze solution containing any alkanetriol.

As shown in FIG. 1, the first embodiment of the direct antifreeze cooled fuel cell power plant system 10 includes several separate components that serve to enhance the humidity of the reducing fluid and process oxidant streams to maintain adequate water content of a PEM electrolyte 62, in addition to facilitating water self-sufficiency of the plant 10. Self-sufficiency in water means that enough water must be retained within the plant to offset losses from plant exhaust streams to efficiently operate the plant. For example, any water exiting the plant through a plant exhaust stream consisting of a cathode exhaust stream of gaseous oxidant and/or an anode exhaust stream of gaseous reducing fluid must be balanced by water produced electrochemically at the cathode catalyst 20. One such component to enhance proper humidification of a PEM electrolyte 62 is an anode exhaust recycle line means 92 for selectively recycling a portion of the anode exhaust stream leaving the anode flow field 14 within the anode exhaust passage 20 back into the fuel inlet passage 18, including the anode recycle line 92 and optionally an anode recycle valve and blower means (not shown) secured to the line 92 for selectively directing a portion of the anode exhaust stream from the anode exhaust passage 20 to the fuel inlet passage 18, such as, for example, at the reducing fluid inlet 136 adjacent the anode flow field 14, as shown in FIG. 1. An additional and similar component is a cathode recycle line means 94 for selectively recycling a portion of a cathode exhaust stream leaving the cathode flow field 22 within the cathode exhaust passage 32 back into the oxidant inlet 26, such as into the second extension 30 of the oxidant inlet 26, as shown in FIG. 1, including the cathode recycle line 94 and optionally a cathode recycle valve and blower means (not shown) for selectively recycling a portion of the cathode exhaust stream from the cathode exhaust passage 32 to the oxidant inlet 26 at the second extension 30 of the inlet 26.

A further component utilized for maintaining water self-sufficiency of the system 10 is a direct mass and heat transfer device means for directly transferring mass from a first fluid stream passing through the device to a second fluid stream passing through the device, such as a direct mass and heat transfer device 96 secured in fluid communication with both the oxidant inlet 26 and a plant exhaust passage 98 that receives the cathode exhaust stream exiting the fuel cell 12 within the exhaust passage 32. The plant exhaust passage 98 directs a plant exhaust stream into the mass and heat transfer device 96 and a plant exhaust vent 100 directs the plant exhaust stream out of the device 96 and out of the direct antifreeze cooled fuel cell power plant system 10. The oxidant inlet 26 directs the process oxidant stream from the oxidant supply 24 into the mass and heat transfer device 96, and the first and second extensions 28, 30 of the oxidant inlet 26 direct the process oxidant stream from the direct mass and heat transfer device 96 to the fuel cell 12.

The mass and heat transfer device 96 includes a separator housing or structure 102 that defines an oxidant chamber 104 through which the process oxidant stream passes, and an exhaust chamber 106 through which the exhaust stream passes. The structure 102 also secures a mass transfer medium means for sorbing a fluid substance consisting of polar molecules within the plant exhaust stream and for desorbing the fluid substance consisting of polar molecules into the process oxidant stream. The structure 102 may be a separator housing means for supporting the mass transfer medium means in mass transfer relationship with the plant exhaust stream and process oxidant stream so that both streams contact opposed surfaces of the mass transfer medium means, and for preventing bulk mixing of the plant exhaust and process oxidant streams. An exemplary mass transfer medium means includes a fine pore enthalpy exchange barrier 108 secured in mass transfer relationship between the oxidant and exhaust chambers 104, 106 so that the process oxidant stream within the oxidant chamber 104 passes adjacent an inlet surface 110 of the barrier and the plant exhaust stream within the exhaust chamber 106 passes adjacent an exhaust surface 112, and the structure 102 secures the fine pore enthalpy exchange barrier 108 as a barrier between the oxidant and exhaust streams (shown schematically in FIG. 1) to prevent bulk mixing of the streams.

The mass and heat transfer device means may also include a liquid transfer medium supply means for supplying a liquid transfer medium to the fine pore enthalpy exchange barrier 108, such as a transfer medium circulating loop 114 that supplies a portion of the direct antifreeze solution to the fine pore enthalpy exchange barrier 108. The transfer medium circulating loop 114 may include a liquid transfer medium feed line 116 secured between the exchange barrier 108 and the coolant feed line 38, such as at a first coolant valve means 118 secured along the liquid transfer medium feed line 116 in fluid communication with the first extension 48 of the coolant feed line 38 (as shown in FIG. 1), for selectively feeding a portion of the direct antifreeze solution to the fine pore enthalpy exchange barrier 108. The transfer medium loop also includes a liquid transfer medium return line 120 secured between the exchange barrier 108 and the coolant feed line first extension 48, so that the direct antifreeze solution may be cycled through the transfer medium means exchange barrier 108 for replacement and treatment, as described in more detail below.

A preferred fine pore enthalpy exchange barrier 108 includes a support matrix means for defining hydrophilic pores having a pore-size range of between 0.1–100 microns that results in the barrier having a bubble pressure of greater than 0.2 pounds per square inch ("p.s.i.") when the hydrophilic pores are wetted by a liquid transfer medium such as the direct antifreeze solution, and for being chemically stable in the presence of the liquid transfer medium. The bubble pressure requirement of the support matrix is dictated by the specific design of the fuel cell power plant 10 and the mass and heat transfer device 96 which set a maximum pressure differential between the plant exhaust stream within the exhaust passage 106 and the process oxidant stream within the oxidant inlet line 26. In operation of the direct mass and heat transfer device 96, as the plant exhaust stream passes through the exhaust chamber 106, water vapor from the fuel cell 12 is sorbed by the liquid transfer medium direct antifreeze solution within the fine pore enthalpy exchange barrier 108 and desorbed from the liquid transfer medium into the process oxidant stream within the oxidant chamber 104, thereby adding heat to, and humidifying the process oxidant stream before it enters the cathode flow field 22.

The direct antifreeze cooled fuel cell power plant system 10 also includes fuel processing component means for processing hydrocarbon fuels into reducing fluids appropriate for providing fuel to an anode electrode of the fuel cell 12, and for controlling a concentration of direct antifreeze in the direct antifreeze solution. Exemplary hydrocarbon fuels for powering such a fuel cell 12 include gasoline, diesel fuel, butane, propane, natural gas, methanol, ethanol, etc. The fuel processing component means may include: a burner 122 that may be a conventional or preferably a catalytic burner (labeled "BURNER" in FIGS. 1 and 3 for convenience) that oxidizes any excess reducing fluid such as hydrogen fed to the burner 122 as an anode exhaust stream through the anode exhaust passage 20 after passing through the anode flow field 14; a boiler 124 secured in heat transfer relationship with the burner 122 that receives a portion of the direct antifreeze solution through a boiler feed line 126 secured in fluid communication between the boiler 124 and the thermal management system 54, for example at the first extension 48 of the coolant feed line 38; a steam separator 128 that receives steam and liquid direct antifreeze solution from the boiler 124 in a separator feed line 127 that separates the steam from the liquid direct antifreeze solution; a reformer 130 that may be an autothermal reformer, or other well-known reformer means (labeled "REFORMER" in FIGS. 1 and 3) that receives the separated steam from the steam separator 128 in a steam feed line 132 and that receives the hydrocarbon fuel in the fuel delivery line 18 (which may first deliver the fuel to the steam feed line 132 (as shown in FIG. 1)) for reforming the hydrocarbon fuel into the reducing fluid; a reformed fuel discharge line 134 secured in fluid communication between the reformer 130 and a reducing fluid inlet 136; and, a liquid return line 138 secured in fluid communication between the steam separator 128 and the thermal management system 54, such as at the first coolant valve means 118 (as shown in FIG. 1) that returns the separated liquid direct antifreeze solution from the steam separator 128 to the thermal management system 54.

A boiler feed pump 140 may be secured between a coolant diversion line 142 and the boiler feed line 126 to pump the direct antifreeze solution cooling fluid into the fuel process component means. Additionally, a pre-boiler heat exchanger 144 may be secured to both the boiler feed line 126 delivering the direct antifreeze solution to the boiler 124 and the liquid return line 138 directing the liquid heated in the boiler 124 back to the thermal management system 54 in order to pre-heat the direct antifreeze solution before it passes into the boiler. A steam vent 146 may be secured to the steam feed line 132 including a steam discharge valve 148 for selectively discharging excess steam out of the system 10. The steam separator 128 may be any known steam separator such as a gravity separator. A reformer extension 150 of the oxidant inlet 28 may also be secured between the second extension 30 of the oxidant inlet and the reformer 130 to supply air to the reformer. A burner extension 152 of the oxidant inlet 28 may also be secured between the oxidant extension 150 and the burner 122 to supply oxidant to the burner to support combustion of the anode exhaust stream that is delivered to the burner 122 in the anode exhaust passage so that unused reducing fluid in the anode exhaust stream is combusted in the burner 122, rendering the anode exhaust stream non-flammable. The combusted anode exhaust stream is then directed from the burner 122 in a burner exhaust line 154 to the plant exhaust passage 98, wherein the combusted anode exhaust stream and cathode exhaust stream from the cathode exhaust passage 32 mix together to become the plant exhaust stream.

The above described embodiment of the direct antifreeze cooled fuel cell power plant system 10 includes fuel processing component means utilizing an autothermal reformer as an exemplary reformer means for reforming the fuel into a hydrogen rich reducing fluid. However, alternative embodiments of the fuel processing means may include differing reformers such as steam and/or partial oxidation reformers, or combinations thereof, employing minor alterations of the flow configurations described above and shown in FIG. 1. The reactants in a steam reformer are a hydrocarbon fuel and water vapor. Use of well known control apparatus means for shutting off or eliminating the oxidant stream passing through the reformer extension 150 of the oxidant inlet 26 to the reformer means 130 effectively allows the fuel processing component means to operate with a steam reformer. The reactants in a partial oxidation reformer are a hydrocarbon fuel and oxygen, such as may be taken from ambient air. Use of well known control apparatus means for shutting off or eliminating the steam within the steam feed line 132 being fed to the reformer means 130 effectively allows the fuel processing component means to operate with a partial oxidation reformer. In an alternative embodiment, the system 10 may utilize the well-known flow control apparatus means so that the fuel processing component means operate first with a partial oxidation reformer, and upon the development of differing operational conditions, as an autothermal reformer.

The coolant valve means 118 that is secured between the liquid return line 138 and the liquid transfer feed line 116 of the circulating loop 96 may be selected to control a rate of return of the direct antifreeze solution from the steam separator 128 of the fuel processing component means to the thermal management system 54, and thereby control a concentration of the direct antifreeze solution within the thermal management system 54. The coolant valve 118 may also control a rate of feed of the direct antifreeze solution into the transfer medium means, such as the fine pore enthalpy exchange barrier 108. As steam is generated and separated through the boiler 124 and steam separator 128, the concentration of direct antifreeze in the direct antifreeze solution within the liquid in the steam separator increases. As small amounts of direct antifreeze solution pass out of the system 10 through, for example, possible loss from the enthalpy exchange barrier into the plant exhaust stream, or as product water from the M.E.A. 58 passes into the thermal management system 54 and dilutes the direct antifreeze solution within the thermal management system 54, the coolant valve means 118 may be adjusted to increase a rate of return of the liquid direct antifreeze solution from the steam separator 128 to increase the concentration of direct antifreeze within the thermal management system 54. The coolant valve means 118 may include sensors to adjust such a rate of flow of the separated liquid back into the thermal management system 54, such as viscosity sensors, well known in the art.

The fuel processing component means may include components that are well-known in conventional steam reforming, autothermal reforming, and partial oxidation processing of various hydrocarbon fuels. The fuel processing components are of relatively conventional design that are generally well-known in the chemical processing arts wherein there is a need to generate hydrogen enriched fluid from common hydrocarbon sources. For example, autothermal reformers in such processes typically burn a portion of the fuel received to reach temperatures approximating 1,700 degrees Fahrenheit (hereafter "° F."). Additional fuel processing component means may include a de-sulfurizer 156 secured on the fuel delivery line 18 to remove any sulfur from the hydrocarbon fuel; a water shift reactor 158 and a selective oxidizer 160, which are secured in series and fluid communication with and along an extension 162 of the reformed fuel discharge line 134 and that direct the reformed fuel into the reducing fluid inlet 136 in order to minimize carbon monoxide levels in the reducing fluid stream entering the anode flow field 22, as is well-known in the art. The fuel processing component means may also include a fuel pump 164 for selectively pumping fuel from the fuel storage component 16 through the fuel processing component means. An oxidant heat exchanger 165 may also be secured in heat exchange relationship between the reformer extension 150 of the oxidant inlet 26 and the burner exhaust line 154 in order to transfer heat from the burner exhaust stream to the oxidant stream entering the fuel processing component means within the reformer extension 150 of the oxidant inlet 26.

The direct antifreeze cooled fuel cell power plant system may also include steam injection means for directing steam from the steam separator 128 to the reactant streams entering the fuel cell 12 to increase humidity of the reducing fluid and process oxidant streams entering the fuel cell 12. The steam injection means may include a reducing fluid steam injection line 166 secured in fluid communication between the steam feed line 132 and the reducing fluid inlet 136, and/or an oxidant steam injection line 168 secured in fluid communication between the steam feed line 132 and the oxidant inlet 26, such as at the second extension 30 of the oxidant inlet 26, as shown in FIG. 1. The steam injection means may also include a first steam injection valve 170 secured to the reducing fluid steam injection line 166 for controlling a rate of steam injection into the reducing fluid inlet 136, and a second steam injection valve 172 secured to the oxidant steam injection line 168 for controlling a rate of steam injection into the oxidant inlet 26. While FIG. 1 shows the reducing and oxidant steam injection lines 166, 168 being separately attached to the steam feed line 132, it is to be understood that for purposes of efficiency, the reducing fluid steam injection or the oxidant steam injection line 166, 168 may branch from each other sharing a common line into the steam feed line 132, and it is not necessary to have two separate lines from the steam feed line 132. Alternatively, the steam injection means may include only one steam injection line, either the reducing fluid 166 or oxidant 168 steam injection line directing steam from the steam feed line 132 to either the reducing fluid inlet 136 or the oxidant inlet 26.

Figure 3:
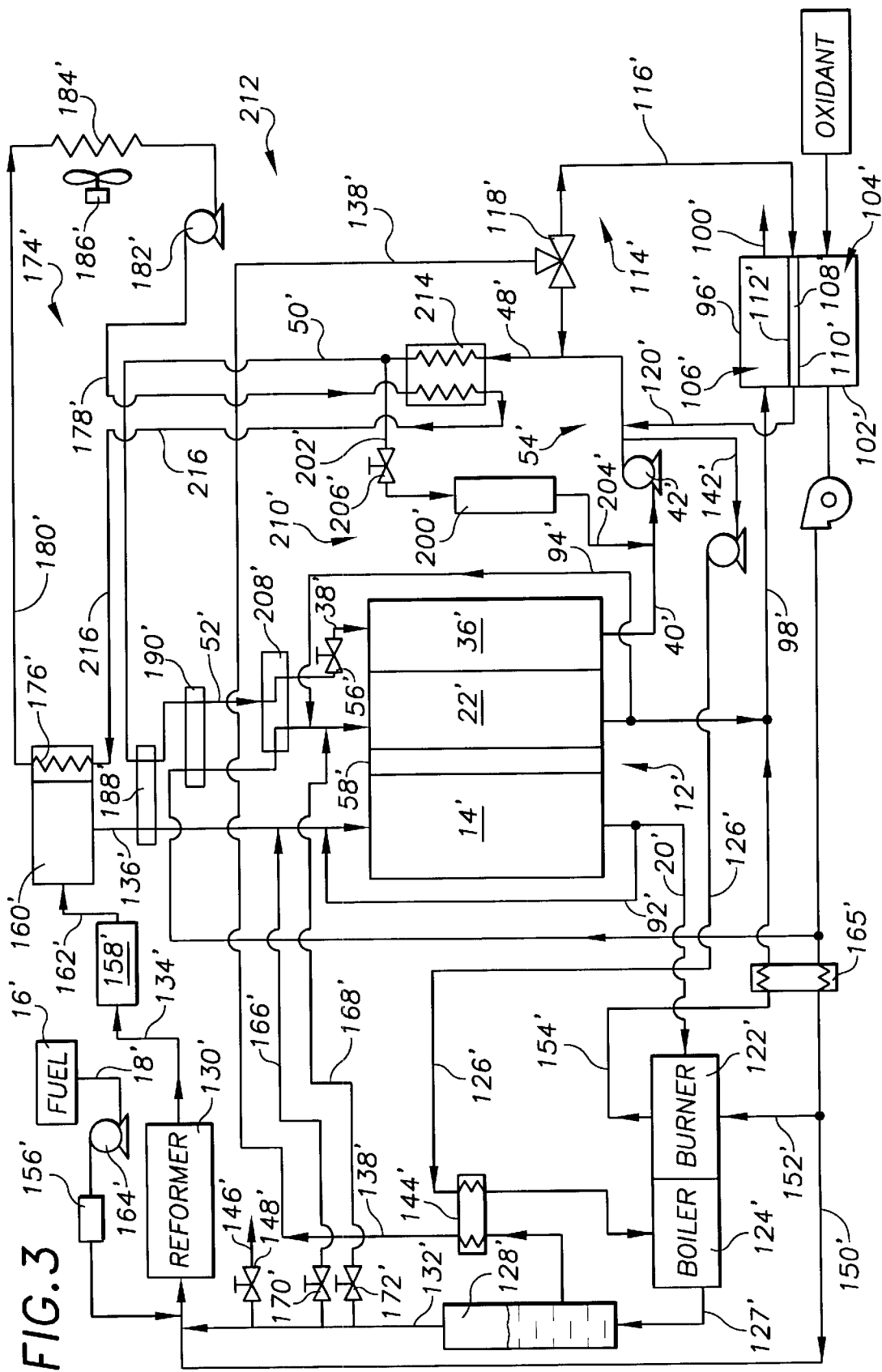
FIG. 3 is a schematic representation of a second embodiment of a direct antifreeze cooled fuel cell power plant system constructed in accordance with the present invention.

The fuel processing component means may also include a fuel processing thermal exchange loop means 174 having a third heat exchanger 176 secured in heat exchange relationship with the reformed fuel passing through the selective oxidizer 160 (as shown in FIGS. 1 and 3), or secured on the reducing fluid inlet 136 between the selective oxidizer 160 and the fuel cell 12, for passing the reformed fuel in heat exchange relationship with a second cooling fluid passing through the third heat exchanger 176 to remove heat from the reformed fuel that the fuel receives as a result of the reaction within the selective oxidizer 160. The fuel processing thermal exchange loop 174 may also include a second coolant feed line 178 that directs the second cooling fluid to the third heat exchanger 176; a second coolant return line 180 that removes the second coolant from the third heat exchanger 176; a second coolant pump 182 secured on the second coolant feed line 178 (as shown in FIGS. 1 and 3), or on the second coolant return line 180 for pumping the second cooling fluid; a second coolant heat exchanger 184 secured between the second coolant return line 180 and the second coolant feed line 178 for removing heat from the second cooling fluid; and a second coolant fan 186 for passing air through the second coolant heat exchanger 184 for removing heat from the second cooling fluid within the second coolant heat exchanger 184. The second cooling fluid may be a conventional antifreeze, or may be one of the above-described direct antifreeze solutions, a special direct antifreeze solution, or an alkanetriol direct antifreeze solution.

It is well known that the primary reaction within the selective oxidizer 160 is the oxidation of carbon monoxide to carbon dioxide. This reaction is exothermic and the heat of reaction is typically removed by a heat exchanger, such as the third heat exchanger 176, that may be incorporated with the selective oxidizer (as shown in FIG. 1), or alternatively may be secured downstream of the selective oxidizer to cool the reformed fuel before it enters the fuel cell 12. Such a selective oxidizer typically reduces the carbon monoxide content from a selective oxidizer inlet concentration of about 10,000 ppm to approximately 10 ppm at an exit of the selective oxidizer. The operating temperatures of selective oxidizers are typically in the range of 200° F.–300° F. U.S. Pat. No. 5,330,727 describes a typical selective oxidizer apparatus for removing carbon monoxide from a fuel stream, which Patent is owned by the assignee of all rights in the present invention, and which Patent is hereby incorporated herein by reference.

The direct antifreeze cooled fuel cell power plant system 10 also includes additional components that serve to humidify the reducing fluid and process oxidant reactant streams entering the anode and cathode flow fields 14, 22 of the fuel cell 12. One such component is a fuel saturator 188 secured to the third extension 52 of the coolant feed line 38 and the reducing fluid inlet 136. A similar component is an oxidant saturator 190 secured to the third extension 52 of the coolant feed line 38 and to the second extension 30 of the oxidant inlet 26. The fuel and oxidant saturators 188, 190 may be any fuel or oxidant saturator means such as known mass transfer apparatus for effecting mass transfer between a liquid stream and a gas stream, such as well known packed beds, wetted films, spray towers, or the like. It is well known that with packed beds, etc., liquid water within the direct antifreeze solution cooling fluid will vaporize and pass into the gaseous reducing fluid and process streams to increase the humidity of the reducing fluid and process oxidant reactant streams.

As shown in FIGS. 1 and 3, the direct antifreeze cooled fuel cell power plant system 10 also includes components for treating the direct antifreeze solution. The components include a demineralizer 200 secured in fluid communication with the thermal management system 54 through a demineralizer feed line 202 secured to the demineralizer 200 and the second extension of the coolant feed line 50, down stream from the coolant pump 42 and coolant heat exchanger 44. The demineralizer 200 is a standard demineralizer that contains ion exchange resins which absorb dissolved ions in the cooling fluid. The demineralizer 200 thereby maintains a low conductivity in the coolant thus minimizing shunt current corrosion within the fuel cell 12. A demineralizer return line 204 directs the portion of the cooling fluid passing from the second extension of the coolant feed line 50 and through the demineralizer 200 back into the thermal management system 54, for example at the coolant discharge line 40. A second coolant trim valve means 206 may be secured to the demineralizer feed line 202 for controlling a rate of circulation of the cooling fluid from the demineralizer 200 into the thermal management system 54 and back into the demineralizer 200, as shown in FIG. 1. The demineralizer 200 may be any known demineralizer means for removing dissolved metals in the cooling fluid solution, such as the demineralizer shown in the aforesaid U.S. Pat. No. 4,344,850 to Grasso, which Patent is owned by the assignee of all rights in the present invention.

An additional component for treating the direct antifreeze solution cooling fluid is a degasifier 208. The degasifier removes dissolved gases, such as carbon dioxide, from the cooling fluid. This decreases demand on the demineralizer 200 because the carbon dioxide hydrolyzes to carbonic acid. The degasifier 208 is secured to the third extension 52 of the coolant feed line 38 up stream of the fuel cell 12, and also secured to the second extension 30 of the oxidant inlet 26, again upstream of the cell 12. Like the fuel saturator 188 and oxidant saturator 190, the degasifier 208 may be a degasifier means for removing dissolved contaminants in the direct antifreeze solution, such as dissolved $CO_2$, $NH_3$, etc. The lines for the coolant feed line third extension 52 and second extension 30 of the oxidant inlet 26 pass through the FIG. 1 schematic box for the degasifier 208 to indicate the degasifier 208 means affords mass transfer of the dissolved contaminants from the liquid cooling fluid direct antifreeze solution stream into the gaseous process oxidant stream. The degasifier 208 may therefore be any known mass transfer apparatus capable of effecting mass transfer between a liquid stream and a gaseous stream, including well known packed beds, wetted films, spray towers, etc. The demineralizer 200, degasifier 208 and the described coolant feed lines and second extension 30 of the oxidant inlet 26 that direct the direct antifreeze solution and oxidant stream to treat the cooling fluid comprise a water treatment system 210.

Because of the above described low volatility and other characteristics of the direct, special direct and alkanetriol direct antifreeze solutions used as the cooling fluid in the direct antifreeze cooled fuel cell power plant system 10, the cooling fluid does not evaporate out of the degasifier 208 (or fuel and oxidant saturators 188, 190 for the same reasons) at unacceptable rates. Instead the cooling fluid is effectively treated by the demineralizer 200 and degasifier 208 to remove contaminants that could deteriorate the cooling fluid by increasing its conductivity which could lead to shunt current corrosion in coolant channels 82, 86, or in the manifolds of the cell 12 resulting in degraded performance of the system 10.

A second embodiment 212 of the direct antifreeze cooled fuel cell power plant system is shown schematically in FIG. 3, and includes many components that are virtually identical to components shown in FIG. 1 and described above. The virtually identical components in FIG. 3 are designated in FIG. 3 and herein as primes of the reference numeral utilized for the same or similar component in FIG. 1 for efficiency. For example, in FIG. 1, the anode flow field is designated by the reference numeral 14, and in FIG. 3, the anode flow field of the second embodiment of the system 212 is designated by the reference numeral 14'.

The second embodiment of the direct antifreeze cooled fuel cell power plant system 212 differs from the FIG. 1 embodiment by having the second coolant feed line 178' pass through a coolant-coolant heat exchanger 214 that is also secured to the coolant feed line 38', such as at the first extension 48' of the feed line 38' downstream of the coolant pump 42'. A second coolant feed line extension 216 is secured between the coolant-coolant heat exchanger 214 and the third heat exchanger 176' so that the second cooling fluid thereby serves to remove heat from the direct antifreeze solution cooling fluid within the thermal management system 54', and transfers that heat to be removed from the system 212 through the second coolant heat exchanger 184'.

As shown in FIG. 3, by use of the coolant-coolant heat exchanger 214 in cooperation as described with the second coolant heat exchanger 184', the coolant fan 46 may be eliminated. Additionally, in the second embodiment of the system 212 the second cooling fluid may be a conventional antifreeze so that the only second embodiment system 212 heat exchanger exposed to moving ambient air (such as by the second cooling fan 186', or by movement of a vehicle (not shown) powered by the system 186 through ambient air, or by both) may only have a conventional antifreeze passing through it. Therefore, the special direct antifreeze solution passing through the thermal management system 54' would be further protected against loss from the system 212, for example by a damaging impact of a foreign object in the ambient air contacting and damaging the second coolant heat exchanger 184'. In use of the second embodiment of the system for a direct antifreeze cooled fuel cell 212 to power a transportation vehicle, the second coolant heat exchanger 184' could be structured much like a conventional automobile radiator to take advantage of ambient air currents. Therefore it would be subject to potential damage from foreign objects and ordinary wear and tear. By use of the coolant-coolant heat exchanger 214, the more costly direct antifreeze solutions would be protected from any loss resulting from such radiator damage. An additional advantage of using two antifreeze solutions is that the direct antifreeze solution may be used in portions of the direct cooled fuel cell power plant system 212 where the surface tension and vapor pressure requirements of the antifreeze are critical, such as the fuel cell 12', the reactant stream saturators 188', 190', the degasifier, 208', and the direct mass and heat transfer means 96'. The conventional antifreeze may be used in the non-critical portions of the system 212 such as the second coolant heat exchanger 184' or radiator for cooling the total system 212, and the third heat exchanger for cooling the selective oxidizer 160'. The conventional antifreeze in the thermal exchange loop 174', of the fuel processing component means may include well known inhibitors which are used to prevent corrosion of materials used in conventional cooling systems thereby permitting use of lower cost materials.

By integrating the direct antifreeze solutions with the above described thermal management system 54, water treatment system 210, and direct mass and heat transfer means 96, the direct antifreeze cooled fuel cell power plant system 10 is able to minimize an amount of free water within the power plant that is susceptible to freezing when the system 10 is operated in, or between operating periods in, sub-freezing ambient conditions, while also minimizing weight, cost and volume requirements for producing such a system 10 compared to known fuel cell power plant operating systems that may be capable of operating a vehicle in sub-freezing conditions.

An exemplary fuel cell including a PEM electrolyte, wetproofed anode and cathode substrates 70, 76 and anode and cathode diffusion layers 72, 78 demonstrated efficient test performance without unacceptable adsorption of a glycerol-water direct antifreeze solution to the anode or cathode catalysts 64, 66. The exemplary fuel cell included a PEM electrolyte within a membrane electrode assembly acquired from W.L. Gore and Associates, Inc. of Elkton, Md. as product identification no. "PRIMEA-5560".

The porous anode and cathode substrate layers were porous carbon-carbon fibrous composite and were acquired as grade TGP-H-060 from the Toray Company of New York, N.Y. The anode and cathode substrate layers were a preferred embodiment, being uniformly wetproofed with Teflon grade "FEP-121" sold by the E.I. DuPont Company, of Willmington, Del., by wetproofing procedures well-known in the art.

The porous anode and cathode gas diffusion layers were applied to both the anode and cathode substrates by procedures well-known in the art and described in U.S. Pat. No. 4,233,181, which patent is owned by the assignee of all rights in the present invention, and which patent is hereby incorporated herein by reference. The anode and cathode diffusion layers consisted of about 50 percent Vulcan XC-72 obtained from the Cabot Corporation of Billerica, Mass. and about 50 percent Teflon, grade "TFE-30", obtained from the aforesaid E.I. Dupont Company.

The cell anode and cathode flow fields were porous and defined within anode and cathode water transport plates. The water transport plates were porous graphite having a mean pore size of approximately 2–3 microns. The plates were made wettable by treating them with tin oxide in a procedure described in U.S. Pat. No. 5,840,414 owned by the assignee of all rights in the present invention, which patent is here by incorporated herein by reference.

A process oxidant stream flowing through the cell defined as a single pass oxidant flow pattern is characterized herein for convenience as an oxidant flow axis between and oxidant inlet and an oxidant outlet for purposes of comparison to flow patterns of the reducing fluid and antifreeze solution coolant streams passing through the cell. The reducing fluid defined a two-pass reducing fluid pattern flowing essentially perpendicular the oxidant flow axis, crossing the oxidant flow axis twice, and flowing also in a direction generally from the oxidant inlet to the oxidant outlet. The antifreeze solution coolant stream defined a three-pass flow pattern essentially perpendicular to the oxidant flow axis, crossing the oxidant flow axis about three times and flowing generally in a direction from the oxidant outlet to the oxidant inlet. For purposes of convenience, the aforesaid reducing fluid flow pattern will be referred to as transverse-concurrent to the oxidant flow axis, and the aforesaid antifreeze solution coolant stream flow pattern will be referred to as transverse-opposite to the oxidant flow axis. Although this test was done with an antifreeze solution coolant stream flow pattern that was transverse-opposite to the oxidant flow axis, a preferred configuration is transverse-concurrent because that minimizes a cell temperature at the oxidant inlet which maximizes local relative humidity, thereby minimizing humidification requirements and also minimizing drying of the electrolyte.

The cell was operated at a nominal temperature of 65 degrees centigrade (hereafter "° C.") and was nearly isothermal to within approximately plus or minus 5° C. The fuel used for the test performance of the exemplary cell was hydrogen. The fuel was humidified to approximately 100 percent relative humidity at 65° C. The fuel flow was varied in proportion to the current density of the cell to maintain a hydrogen utilization of 80 percent ("%"). The fuel pressure was approximately 14.7 PSIA. The oxidant used for the test was air. The oxidant was humidified over a range of approximately 0–100% relative humidity at 65° C. by passing the process oxidant stream through a standard saturator. The oxidant flow was varied in proportion to the current density of the cell to maintain an oxygen utilization of 30%. The oxidant pressure was approximately 14.7 PSIA.

The coolant stream used for the test ranged from pure water to 65% glycerol and 35% water. The glycerol used was a certified ACS grade 99.9% glycerol. It is pointed out that use herein of the word "glycerol" as a form of antifreeze solution cooling fluid is meant to include "glycerin", where "glycerin" is understood herein and in general acceptance to include glycerol and water solutions or mixtures. Concentration of the glycerol in the antifreeze solution (glycerol and water. e.g., "glycerine") was measured by determining the specific gravity of the glycerol and water solution at 20° C. The antifreeze solution coolant stream was circulated through coolant flow channels in both an anode and a cathode water transport plate that defined anode and cathode flow field channels. The inlet and exit temperatures of the coolant stream entering and leaving the cell were 65° C. plus or minus 5° C.

The cell was initially tested with pure water as the cooling fluid. The current density was set at 250 amps per square foot (hereafter "ASF") and the cell voltage was monitored over a period of about 4 hours. Both the fuel and the oxidant were saturated to approximately 100% relative humidity at 65° C. Subsequently the coolant composition was changed to approximately 15, 30, 50 and 65 weight percent glycerol. The performance was monitored for 4 hours after each change in glycerol concentration. The results are listed in Table 1.

TABLE 1

Cell Performance At 250 ASF At Varying Concentrations of Glycerol Antifreeze Solution

| % Glycerol | Initial Cell Voltage in Volts | Cell Voltage After 4 Hours in Volts |
| --- | --- | --- |
| 0 | 0.765 | 0.750 |
| 15 | 0.757 | 0.756 |
| 30 | 0.740 | 0.746 |
| 50 | 0.741 | 0.744 |
| 65 | 0.750 | 0.745 |

The tests producing the results listed in Table 1 were performed over a period of five days, and the tests and results are referred to herein for convenience as the "first tests" of a fuel cell for a direct antifreeze cooled fuel cell power plant system 10. The coolant flow rate was maintained 65° C. plus or minus 5° C. at all time during the test. The data in Table 1 demonstrate that there is no adverse effect on performance of replacing water as the coolant with an antifreeze solution that contains up to 65% glycerol.

In a second series of tests, the glycerol concentration was maintained at approximately 60% and the relative humidity of the process oxidant stream was varied from 0% to 100% at the fuel cell oxidant inlet. All of the test parameters of the first tests were as described above for the second tests. The relative humidity of the process oxidant stream was varied from approximately 100% to 57%, 31%, 16% and 0%. The performance of the cell was monitored for 4 hours after each change in oxidant relative humidity. The results of the second tests are listed in Table 2.

TABLE 2

Cell Performance at 250 ASF at Varying Oxidant Relative Humidity % With 60% Glycerol Antifreeze Solution

| Oxidant % Relative Humidity | Initial Cell Voltage in Volts | Cell Voltage After 4 Hours in Volts |
| --- | --- | --- |
| 100 | 0.735 | 0.742 |
| 57 | 0.731 | 0.740 |
| 31 | 0.742 | 0.732 |
| 16 | 0.748 | 0.696 |
| 0 | 0.748 | 0.682* |

*Cell voltage after only one hour.

The data in Table 2 of the second tests demonstrate that there is an adverse effect on fuel cell performance of reducing the process oxidant relative humidity at the fuel cell oxidant inlet below approximately 30% relative humidity. At a process oxidant relative humidity of below 30% within the cathode flow field, the antifreeze solution draws moisture out of the process oxidant stream into the cathode water transport plate. Therefore, moisture moves out of the proton exchange membrane (PEM) into the process oxidant stream at a rate that effectively dehydrates the PEM, and therefore results in a decreased performance of the cell.

In yet another, or third test a 2 inch by 2 inch PEM cell containing a membrane electrode assembly, model no. "PRIMEA-5510", obtained from the aforesaid W.L. Gore Associates Company, was tested. The cell configuration was identical to the previously described tests except that the anode catalyst was 0.4 milligrams per square centimeter of platinum, and there was no coolant.

The cell was operated at 14.7 PSIA at 65° C. on hydrogen and air saturated to about 100% relative humidity with respective utilizations of 80% and 30% at 500 amperes per square foot ("ASF"). A portion of the dry oxidant was passed through a saturator filled with glycerol and then mixed with the humidified air prior to introduction to the cell. The glycerol concentration in the vapor at the oxidant inlet 74 was set to be approximately 4 parts per million which is the equilibrium concentration of glycerol above a 55 weight per cent glycerol solution at 65° C. The objective was to evaluate how quickly glycerol poisoned the cell. This test was run for 16 hours. During this time the cell voltage decayed from an initial value of 0.683 volts to a final value of 0.638 volts. The potential of both electrodes was raised to an air open circuit potential. The performance of the cell after this treatment was that the cell recovered to 0.681 volts.

Cyclic voltammetry on this cell in another, or fourth test showed that glycerol did slowly adsorb onto the anode catalyst; but was cleanly oxidized at a potential of approximately 0.5 volts versus a hydrogen reference electrode.

These tests demonstrate that glycerol is oxidized in a PEM cell in the potential range of typical PEM cells. The normal potential excursions of the electrode during start-up and shutdown of a fuel cell used in vehicular applications should be sufficient to oxidize trace quantities of antifreeze solution which may come into contact with the anode and/or cathode catalysts.

The first and second tests also establish that the direct antifreeze cooled fuel cell 12 can maintain an efficient level of performance, and that having a direct antifreeze solution in direct fluid communication with the cathode catalyst does not significantly deteriorate cell performance as a result of any adsorption by the cathode catalyst of the antifreeze solution and resulting poisoning of the cell. The cell used in these tests was exposed to a glycerol-water solution for approximately 500 hours hot time at 65° C. and for 125 hours of load time without exhibiting any adverse performance loss.

Moreover, the results of the first and second tests indicate that in a preferred embodiment the optionally wetproofed or hydrophobic cathode and anode substrate layers and wetproofed or hydrophobic cathode and anode gas diffusion layers effectively limit movement of any significant amount of antifreeze solution from the water transport plates into the membrane electrode assembly where the antifreeze solution would poison the catalysts in the cell. Furthermore, water management dynamics within the cell create a water rich antifreeze solution at the interface between the reactant fluids and the water transport plates. This effectively lowers the antifreeze concentration at this interface which further limits the amount of antifreeze available for transfer to the membrane electrode assembly by diffusion. At the anode catalyst, water condenses from the saturated reducing fluid stream, thus creating a water rich reactant fluid-water transport plate interface. At the cathode catalyst, the production of water and its subsequent flow as a liquid or diffusion as a vapor from the cathode catalyst to the cathode water transport plate also results in a water rich reactant fluid-water transport plate interface.

Figure 4:
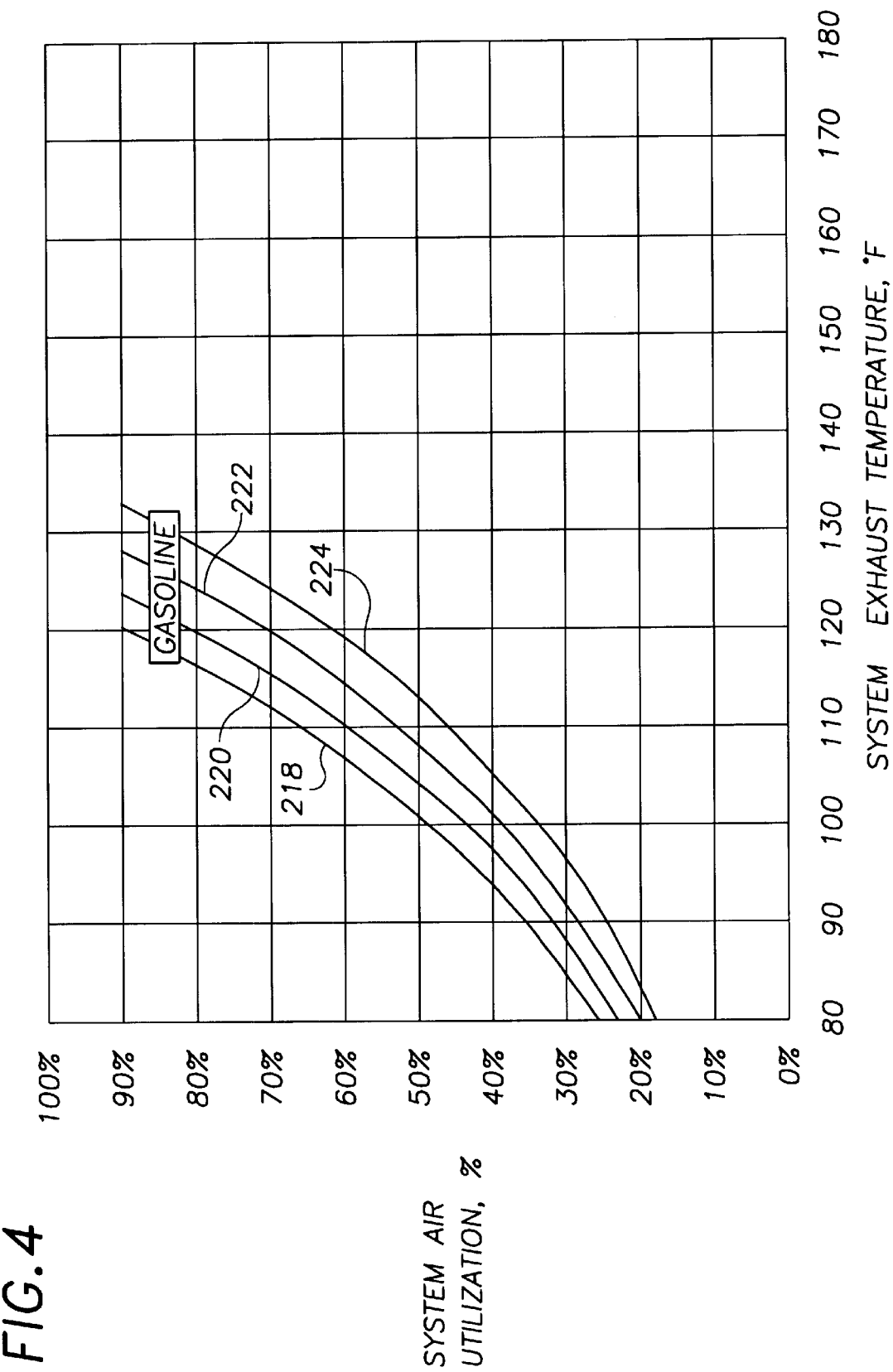
FIG. 4 is graph showing exhaust stream temperatures plotted for various rates of oxygen utilization by a direct antifreeze cooled fuel cell power plant system of the present invention.

FIG. 4 is a graph showing plots of allowable air or oxidant utilization by the fuel cell 12 to maintain water balance in the direct antifreeze cooled fuel cell power plant system 10 operated at about ambient pressure as a function of a temperature of the cathode exhaust stream for a gasoline fueled fuel cell 12 where a direct antifreeze solution is utilized in varying concentrations and the relative humidity of the process oxidant stream varies. Going from left to right on the FIG. 4 graph, the first plot line 218 shows the system air utilization and exhaust temperature at water balance when the cooling fluid passing through the cathode water transport plate 74 is at 0% glycerol, at a freezing temperature of 32° F., and the oxidant is at 100% relative humidity. For the second plot line 220 4, the direct antifreeze solution is at 33% glycerol, at a freezing temperature of 12° F., and the oxidant is at 90% relative humidity. For the third plot line 222, the direct antifreeze solution is at 52% glycerol, at a freezing temperature of −13° F., and the process oxidant stream is at 80% relative humidity. For the fourth plot line, 224, the direct antifreeze solution is at 65% glycerol, at a freezing point of −49° F., and the process oxidant stream is at 70% relative humidity.

As is apparent, use of the direct antifreeze solution allows the system exhaust temperature to be increased for a given air utilization; or conversely, allows the air utilization to be increased for a given exhaust temperature. Increasing the air utilization decreases parasitic power required to pump the ambient air with the oxidant blower 34; while increasing the allowable system exhaust temperature facilitates achieving water balance in high temperature ambient conditions, thereby evidencing further benefits of the direct antifreeze cooled fuel cell power plant system 10.

It is stressed that by the phrases "in direct fluid communication with", of "in fluid communication with" used herein, it is meant that there are no physical barriers between respective components. For example, in the fuel cell 12 of the direct antifreeze cooled fuel cell power plant system 10, the porous cathode substrate 76 is secured in direct fluid communication with the cathode catalyst 66, and the cathode water transport plate 74 is secured in direct fluid communication with porous cathode substrate 76. Consequently, there are no solid barriers to gaseous and/or liquid flow between the cathode water transport plate 74 and the cathode catalyst 66. For example, it is known to utilize a semi-permeable membrane that restricts gaseous flow, but permits selective liquid communication between components on opposed sides of the membrane for purposes of humidifying gaseous reactant streams, etc. With the direct antifreeze cooled fuel cell 12 of the present invention, no such physical barriers are positioned between the cathode water transport plate 74 and the cathode catalyst 66, and no such barriers are positioned between the anode water transport plate 68 and the anode catalyst 64.

It can be seen that in the direct antifreeze cooled fuel cell power plant system 10 almost all liquid water is exposed to the direct antifreeze solution, whether in the fuel cell 12 components, the thermal management system 54, the fuel processing component means; the water treatment system 184, or the direct mass and heat transfer means 96, and hence will not freeze during operation of the cell 12, or during cell shut down in sub-freezing conditions. The water within the PEM electrolyte is not exposed to the direct antifreeze solution. However during operation of the cell 12, heat is generated by the well-known electrochemical reactions that prevent any freeze problems for water within the electrolyte. During shut down of the direct antifreeze cooled fuel cell power plant system 10, a portion of the relatively small amount of water within the electrolyte will evaporate and pass as a vapor through the adjacent porous anode and cathode diffusion and substrate layers into the cathode and anode water transport plates 74, 68, and simultaneously some of the antifreeze solution will evaporate and move into the electrolyte to lower the freezing temperature of a solution remaining in the electrolyte, thus also minimizing freezing and subsequent melt requirements for start up of the fuel cell 12. Upon start up, any antifreeze solution adsorbed by the cell anode and cathode catalysts 64, 66, or contained in the electrolyte 62, will be oxidized at the anode and cathode catalysts by the cell potentials during a start up procedure.

Accordingly, it can be seen that the unique physical and chemical properties of the direct antifreeze cooled fuel cell power plant system 10 cooperate to produce an unexpected result that using a direct antifreeze solution as a cooling fluid in direct fluid communication with cell anode and cathode catalysts 64, 66 does not significantly decrease cell performance, and that by integrating the direct antifreeze solution with the thermal management system 54, the fuel processing component means, the water treatment system 210 and the direct mass and heat transfer device 96, components of those systems are also protected from problems associated with operating the plant at sub-freezing temperatures. Moreover, by supplying the boiler 124 of the fuel processing component means with the direct antifreeze solution, the boiler 124 and steam separator 128 are also protected against freezing. The direct mass and heat transfer device 96 further supports the system 10 by operating to restrict water loss from the system 10, and returning water exiting the fuel cell 12 back into components of the system 10 through the oxidant inlet 26.

While the present invention has been described and illustrated with respect to particular constructions of a direct antifreeze cooled fuel cell power plant system 10, it is to be understood that the system is not to be limited to the described and illustrated embodiments. For example, while the test results of the exemplary fuel cell described above are for a cell utilizing a PEM electrolyte, the fuel cell 12 may use alternative electrolytes known in the art. Additionally, while the illustrated embodiment of an exemplary fuel cell at FIG. 2 shows an anode diffusion layer 72 between the anode substrate 70 and the anode catalyst 64, and shows a cathode diffusion layer 78 between the cathode substrate 76 and the cathode catalyst 66, it is to be understood that in an alternative embodiment of the fuel cell 12 the diffusion layers 72, 78 may be eliminated, and the cathode substrate 76 and anode substrate 70 may be secured adjacent to and supporting the cathode catalyst 66 and anode catalyst 64 respectively. Also, the cathode diffusion layer 78 or the cathode substrate 76 may not be wetproofed, unlike the test fuel cell used to provide the above described performance results. Further, while the required properties for a direct antifreeze solution have been described relative to a fuel cell operating at about 150° F., it is to be understood that the required properties are independent of the operating temperature of the fuel cell 12. As a further example, the above descriptions refer to fuel cells operated at about or slightly above ambient pressures, however the scope of the present invention includes application to more highly pressurized fuel cells. Consequently, reference should be made primarily to the following claims rather than the foregoing description to determine the scope of the invention.

What is claimed is:

1. A direct antifreeze cooled fuel cell power plant system that generates electrical energy from reducing fluid and process oxidant reactant streams, the system comprising:
   a. at least one fuel cell for producing electrical energy from the reducing fluid and process oxidant streams including an electrolyte secured between an anode catalyst and a cathode catalyst;
   b. a thermal management system for controlling temperature within the power plant including a porous water transport plate secured in direct fluid communication with the cathode catalyst;
   c. a direct antifreeze solution passing through the thermal management system for cooling the fuel cell, wherein the direct antifreeze solution is an alkanetriol direct antifreeze solution; and,
   d. fuel processing component means for processing a hydrocarbon fuel into the reducing fluid including a burner for generating heat, and a reformer means that receives the hydrocarbon fuel for reforming the fuel into the reducing fluid.

2. The direct antifreeze cooled fuel cell power plant system of claim 1, wherein the direct antifreeze solution is an alkanetriol direct antifreeze solution selected from the group consisting of glycerol, butanetriol, and pentanetriol.

3. The direct antifreeze cooled fuel cell power plant system of claim 1, wherein the fuel processing component means includes steam injection means for directing steam from a steam separator to the reactant streams entering the fuel cell to increase humidity of a reactant stream entering the fuel cell.

4. The direct antifreeze cooled fuel cell power plant system of claim 1, wherein the system includes a pressure control means for maintaining a positive pressure differential between the reactant streams passing through the fuel cell and the direct antifreeze solution passing through the porous water transport plate so that the reactant streams within the fuel cell are at a greater pressure than the direct antifreeze solution within the water transport plate.

5. The direct antifreeze cooled fuel cell power plant system of claim 4, wherein the pressure control means maintains a pressure of the reactant streams passing through the fuel cell at between ambient pressure and about 1.0 to 2.0 pounds per square inch above ambient pressure, and maintains a pressure of the direct antifreeze solution within the water transport plate at below ambient pressure.

6. The direct antifreeze cooled fuel cell power plant system of claim 1, wherein the system includes an anode exhaust passage that directs an anode exhaust stream exiting an anode flow field of the fuel cell to the burner so that the burner combusts any unused reducing fluid in the anode exhaust stream.

7. The direct antifreeze cooled fuel cell power plant system of claim 1, wherein the system includes a water treatment system for treating the direct antifreeze solution, including a demineralizer secured in fluid communication with the thermal management system through a demineralizer feed line and return line secured to the thermal management system for passing the direct antifreeze solution through the demineralizer, and including a degasifier means secured in mass transfer relationship between the thermal management system and an oxidant inlet that directs the process oxidant into the fuel cell for removing dissolved contaminants in the direct antifreeze solution.

8. The direct antifreeze cooled fuel cell power plant system of claim 1, wherein the fuel processing component means includes a boiler secured in heat transfer relationship with the burner, the boiler receiving a portion of the direct antifreeze solution through a boiler feed line secured in fluid communication between the boiler and the thermal management system, a steam separator that receives steam and liquid direct antifreeze solution from the boiler that separates steam from liquid direct antifreeze solution, and the reformer means comprises a steam reformer that receives the separated steam from the steam separator and that receives the hydrocarbon fuel for reforming the fuel into the reducing fluid.

9. The direct antifreeze cooled fuel cell power plant system of claim 1, wherein the fuel processing component means includes a boiler secured in heat transfer relationship with the burner, the boiler receiving a portion of the direct antifreeze solution through a boiler feed line secured in fluid communication between the boiler and the thermal management system, a steam separator that receives steam and liquid direct antifreeze solution from the boiler that separates steam from liquid direct antifreeze solution, and the reformer means comprises an autothermal reformer that receives the separated steam from the steam separator, that receives an oxidant stream from an oxidant blower, and that receives the hydrocarbon fuel for reforming the fuel into the reducing fluid.

10. The direct antifreeze cooled fuel cell power plant system of claim 1, wherein the reformer means comprises a partial oxidation reformer that receives an oxidant stream from an oxidant blower and that receives the hydrocarbon fuel for reforming the fuel into the reducing fluid.

11. The direct antifreeze cooled fuel cell power plant system of claim 1, wherein the fuel processing component means includes a boiler secured in heat transfer relationship with the burner, the boiler receiving a portion of the direct antifreeze solution through a boiler feed line secured in fluid communication between the boiler and the thermal management system, a steam separator that receives steam and liquid direct antifreeze solution from the boiler that separates steam from liquid direct antifreeze solution, and a liquid return line secured in fluid communication between the steam separator and the thermal management system that directs the separated liquid direct antifreeze to the thermal management system for controlling a concentration of direct antifreeze in the direct antifreeze solution.

12. A direct antifreeze cooled fuel cell power plant system that generates electrical energy from reducing fluid and process oxidant reactant streams the system comprising:
  a. at least one fuel cell for producing electrical energy from the reducing fluid and process oxidant streams including an electrolyte secured between an anode catalyst and a cathode catalyst;
  b. a thermal management system for controlling temperature within the power plant including a porous water transport plate secured in direct fluid communication with the cathode catalyst;
  c. a direct antifreeze solution passing through the thermal management system for cooling the fuel cell, wherein the direct antifreeze solution is an alkanetriol direct antifreeze solution;
  d. fuel processing component means for processing a hydrocarbon fuel into the reducing fluid including a burner for generating heat, and a reformer means that receives the hydrocarbon fuel for reforming the fuel into the reducing fluid; and,
  e. a fuel processing thermal exchange loop including a heat exchanger secured in heat exchange relationship with reformed fuel heated by a selective oxidizer of the fuel processing component means for passing a second cooling fluid through the heat exchanger to remove heat from the reformed fuel.

13. The direct antifreeze cooled fuel cell power plant system of claim 12, wherein the fuel processing thermal exchange loop further comprises a coolant-coolant heat exchanger secured in heat exchange relationship with the thermal management system that directs the second cooling fluid in heat exchange relationship with the direct antifreeze solution cooling fluid.

14. The direct antifreeze cooled fuel cell power plant system of claim 12, wherein the direct antifreeze solution is an alkanetriol direct antifreeze solution selected from the group consisting of glycerol, butanetriol, and pentanetriol.

15. The direct antifreeze cooled fuel cell power plant system of claim 12, wherein the fuel processing component means includes steam injection means for directing steam from a steam separator to the reactant streams entering the fuel cell to increase humidity of a reactant stream entering the fuel cell.

16. The direct antifreeze cooled fuel cell power plant system of claim 12, wherein the system includes a pressure control means for maintaining a positive pressure differential between the reactant streams passing through the fuel cell and the direct antifreeze solution passing through the porous water transport plate so that the reactant streams within the fuel cell are at a greater pressure than the direct antifreeze solution within the water transport plate.

17. The direct antifreeze cooled fuel cell power plant system of claim 16, wherein the pressure control means maintains a pressure of the reactant streams passing through the fuel cell at between ambient pressure and about 1.0 to 2.0 pounds per square inch above ambient pressure, and maintains a pressure of the direct antifreeze solution within the water transport plate at below ambient pressure.

18. The direct antifreeze cooled fuel cell power plant system of claim 12, wherein the system includes an anode exhaust passage that directs an anode exhaust stream exiting an anode flow field of the fuel cell to the burner so that the burner may combust any unused reducing fluid in the anode exhaust stream.

19. The direct antifreeze cooled fuel cell power plant system of claim 12, wherein the system includes a water treatment system for treating the direct antifreeze solution, including a demineralizer secured in fluid communication with the thermal management system through a demineralizer feed line and return line secured to the thermal management system for passing the direct antifreeze solution through the demineralizer, and including a degasifier means secured in mass transfer relationship between the thermal management system and an oxidant inlet that directs the process oxidant into the fuel cell for removing dissolved contaminants in the direct antifreeze solution.

20. The direct antifreeze cooled fuel cell power plant system of claim 12, wherein the fuel processing component means includes a boiler secured in heat transfer relationship with the burner, the boiler receiving a portion of the direct antifreeze solution through a boiler feed line secured in fluid communication between the boiler and the thermal management system, a steam separator that receives steam and liquid direct antifreeze solution from the boiler that separates steam from liquid direct antifreeze solution, and the reformer means comprises a steam reformer that receives the separated steam from the steam separator and that receives the hydrocarbon fuel for reforming the fuel into the reducing fluid.

21. The direct antifreeze cooled fuel cell power plant system of claim 12, wherein the fuel processing component means includes a boiler secured in heat transfer relationship with the burner, the boiler receiving a portion of the direct antifreeze solution through a boiler feed line secured in fluid communication between the boiler and the thermal management system, a steam separator that receives steam and liquid direct antifreeze solution from the boiler that separates steam from liquid direct antifreeze solution, and the reformer means comprises an autothermal reformer that receives the separated steam from the steam separator, that receives an oxidant stream from an oxidant blower, and that receives the hydrocarbon fuel for reforming the fuel into the reducing fluid.

22. The direct antifreeze cooled fuel cell power plant system of claim 12, wherein the reformer means comprises a partial oxidation reformer that receives an oxidant stream from an oxidant blower and that receives the hydrocarbon fuel for reforming the fuel into the reducing fluid.

23. The direct antifreeze cooled fuel cell power plant system of claim 12, wherein the fuel processing component means includes a boiler secured in heat transfer relationship with the burner, the boiler receiving a portion of the direct antifreeze solution through a boiler feed line secured in fluid communication between the boiler and the thermal management system, a steam separator that receives steam and liquid direct antifreeze solution from the boiler that separates steam from liquid direct antifreeze solution, and a liquid return line secured in fluid communication between the steam separator and the thermal management system that directs the separated liquid direct antifreeze to the thermal management system for controlling a concentration of direct antifreeze in the direct antifreeze solution.

24. A direct antifreeze cooled fuel cell power plant system that generates electrical energy from reducing fluid and process oxidant reactant streams, the system comprising:

a. at least one fuel cell for producing electrical energy from the reducing fluid and process oxidant streams including an electrolyte secured between an anode catalyst and a cathode catalyst;
  b. thermal management system for controlling temperature within the power plant including a porous water transport plate secured in direct fluid communication with the cathode catalyst;
  c. a direct antifreeze solution passing through the thermal management system for cooling the fuel cell, wherein the direct antifreeze solution is an alkanetriol direct antifreeze solution;
  d. fuel processing component means for processing a hydrocarbon fuel into the reducing fluid including a burner for generating heat, and a reformer means that receives the hydrocarbon fuel for reforming the fuel into the reducing fluid; and,
  e. a direct mass and heat transfer device secured in fluid communication with both an oxidant inlet that directs the process oxidant stream into the fuel cell and also with a plant exhaust passage that directs a plant exhaust stream out of the fuel cell for directly transferring mass and heat exiting the plant from the plant exhaust stream into the plant within the process oxidant stream, the direct mass and heat transfer device including a mass transfer medium means for sorbing a polar fluid substance consisting of polar molecules within the plant exhaust stream and for desorbing the polar substance into the process oxidant stream, the mass transfer medium means being supported by a separator housing in mass transfer relationship between the oxidant and exhaust streams.

25. The direct antifreeze cooled fuel cell power plant system of claim 24 wherein the mass transfer medium means includes the direct antifreeze solution as a liquid transfer medium supplied through a liquid transfer medium feed line from the thermal management system.

26. The direct antifreeze cooled fuel cell power plant system of claim 24, wherein the direct antifreeze solution is an alkanetriol direct antifreeze solution selected from the group consisting of glycerol, butanetriol, and pentanetriol.

27. The direct antifreeze cooled fuel cell power plant system of claim 24, wherein the plant includes a pressure control means for maintaining a positive pressure differential between the reactant streams passing through the fuel cell and the direct antifreeze solution passing through the porous water transport plate so that the reactant streams within the fuel cell are at a greater pressure than the direct antifreeze solution within the water transport plate.

28. The direct antifreeze cooled fuel cell power plant system of claim 27, wherein the pressure control means maintains a pressure of the reactant streams passing through the fuel cell at between ambient pressure and about 1.0 to 2.0 pounds per square inch above ambient pressure, and maintains a pressure of the direct antifreeze solution within the water transport plate at below ambient pressure.

29. The dire antifreeze cooled fuel cell power plant system of claim 27, wherein the system includes an anode exhaust passage that directs an anode exhaust stream exiting an anode flow field of the fuel cell to the burner so that the burner may combust any unused reducing fluid in the anode exhaust stream.

30. The direct antifreeze cooled fuel cell power plant system of claim 24, wherein the system includes a water treatment system for treating the direct antifreeze solution, including a demineralizer secured in fluid communication with the thermal management system through a demineralizer feed line and return line secured to the thermal management system for passing the direct antifreeze solution through the demineralizer, and including a degasifier means secured in mass transfer relationship between the thermal management system and an oxidant inlet that directs the process oxidant into the fuel cell for removing dissolved contaminants in the direct antifreeze solution.

31. The direct antifreeze cooled fuel cell power plant system of claim 24, wherein the system includes a fuel processing thermal exchange loop including a heat exchanger secured in heat exchange relationship with reformed fuel heated by a selective oxidizer of the fuel processing component means for passing a second cooling fluid through the heat exchanger to remove heat from the reformed fuel.

32. The direct antifreeze cooled fuel cell power plant system of claim 31, wherein the fuel processing thermal exchange loop further comprises a coolant-coolant heat exchanger secured in heat exchange relationship with the thermal management system that directs the second cooling fluid in heat exchange relationship with the direct antifreeze solution cooling fluid.

33. The direct antifreeze cooled fuel cell power plant system of claim 32, wherein the fuel processing component means includes steam injection means for directing steam from a steam separator to the reactant streams entering the fuel cell to increase humidity of a reactant stream entering the fuel cell.

34. The direct antifreeze cooled fuel cell power plant system of claim 24, wherein the fuel processing component means includes a boiler secured in heat transfer relationship with the burner, the boiler receiving a portion of the direct antifreeze solution through a boiler feed line secured in fluid communication between the boiler and the thermal management system, a steam separator that receives steam and liquid direct antifreeze solution from the boiler that separates steam from liquid direct antifreeze solution, and the reformer means comprises a steam reformer that receives the separated steam from the steam separator and that receives the hydrocarbon fuel for reforming the fuel into the reducing fluid.

35. The direct antifreeze cooled fuel cell power plant system of claim 32, wherein the fuel processing component means includes a boiler secured in heat transfer relationship with the burner, the boiler receiving a portion of the direct antifreeze solution through a boiler feed line secured in fluid communication between the boiler and the thermal management system, a steam separator that receives steam and liquid direct antifreeze solution from the boiler that separates steam from liquid direct antifreeze solution, and the reformer means comprises an autothermal reformer that receives the separated steam from the steam separator, that receives an oxidant stream from an oxidant blower, and that receives the hydrocarbon fuel for reforming the fuel into the reducing fluid.

36. The direct antifreeze cooled fuel cell power plant system of claim 24, wherein the reformer means comprises a partial oxidation reformer that receives an oxidant stream from an oxidant blower and that receives the hydrocarbon fuel for reforming the fuel into the reducing fluid.

37. The direct antifreeze cooled fuel cell power plant system of claim 24, wherein the fuel processing component means includes a boiler secured in heat transfer relationship with the burner, the boiler receiving a portion of the direct antifreeze solution through a boiler feed line secured in fluid communication between the boiler and the thermal management system, a steam separator that receives steam and liquid direct antifreeze solution from the boiler that separates steam from liquid direct antifreeze solution, and a liquid return line secured in fluid communication between the steam separator and the thermal management system that directs the separated liquid direct antifreeze to the thermal management system for controlling a concentration of direct antifreeze in the direct antifreeze solution.

* * * * *